March 16, 1943.                F. C. MARMET                      2,313,833
            DEVICE FOR RESTRICTING MOVEMENT OF AN ANIMAL'S NECK AND HEAD
                             Filed Nov. 10, 1941
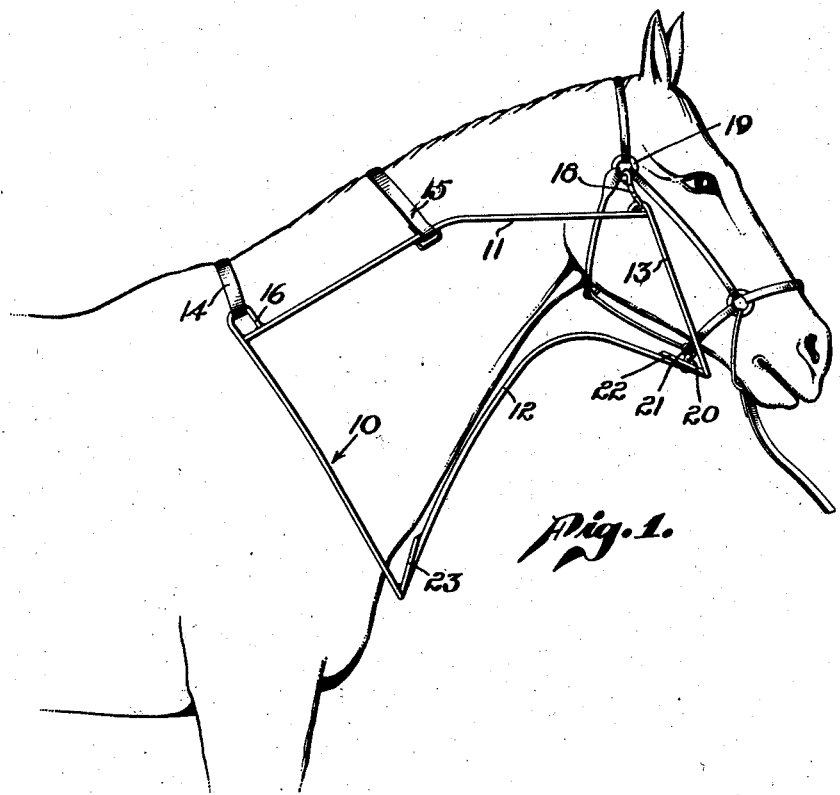
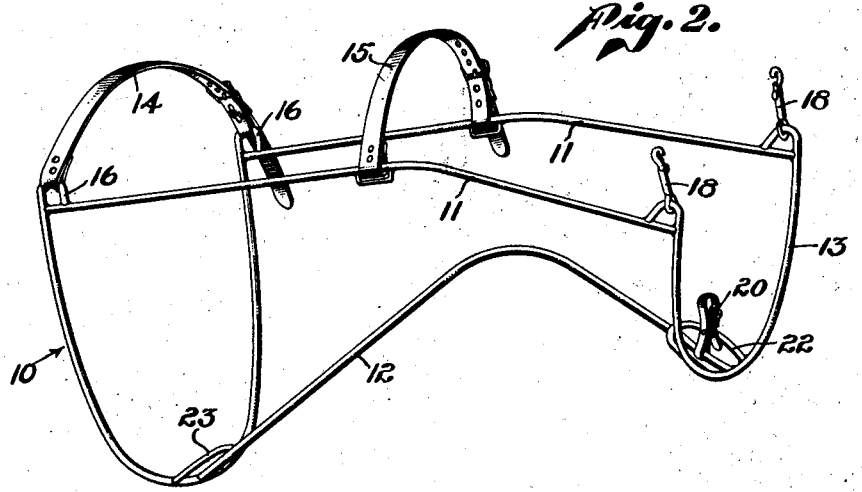
FRED C. MARMET,
INVENTOR
BY
ATTORNEYS Patented Mar. 16, 1943

2,313,833

UNITED STATES PATENT OFFICE 2,313,833

DEVICE FOR RESTRICTING MOVEMENT OF AN ANIMAL'S NECK AND HEAD

Fred C. Marmet, Canoga Park, Calif.

Application November 10, 1941, Serial No. 418,556

5 Claims. (Cl. 119—96)

This invention relates to devices for limiting the movement of the neck and head of horses and the like, to prevent the animal from reaching certain parts of the body with the teeth.

When horses are treated for various disorders of the legs by the process commonly known as "firing," the treatment sets up an irritation and causes the animal to bite the afflicted areas which results in infection and its attendant complications. Accordingly it has been the practice in the past to provide various makeshift devices to prevent the horse from reaching the affected areas with his teeth. A common type of device now in use consists of a series of straight rigid rods or sticks extending lengthwise of the horse's neck and attached near their ends to a pair of straps fastened about the horse's neck, one strap being near the base of the neck and the other near the head. Such devices are dangerous to the welfare of the animal, because the horse often catches the lower ends of some of the sticks over the edge of a lower stable door and in backing away from the stable door causes the sticks to travel upwardly and catch him in the throat. Although these devices limit the downward movement of the animal's neck, they do not prevent movement of the head and are accordingly rather ineffective for the purpose desired. Additionally, the horse soon finds that by striking certain types of restrainers against the lower stable door and bending them, he can reach his legs and bite the areas under treatment. All of the previous devices either suffer the disadvantage that they do not completely prevent the horse from reaching his legs or else they are dangerous to the horse as he moves around, lies down, rolls over, or indulges in other activities common to horses.

Accordingly it becomes an object of the present invention to provide a device for restraining a horse from biting its legs and which will not endanger the animal during use.

It is a further object of the present invention to provide a cradle for restraining a horse from biting its legs which will not unduly restrict him from other activities.

It is a further object of the present invention to provide a device of the character described which can be adjusted to fit different horses.

It is a further object of the present invention to provide a device of the character described which cannot be distorted by the horse.

It is a further object of the present invention to provide a device of the character described which is light in weight, simple in character and free of projections.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring now to the drawing:

Figure 1 is a side view of a device embodying the present invention applied to a horse; and Figure 2 shows an enlarged perspective view of the device of Figure 1.

The device shown comprises a collar 10, consisting of a generally U-shaped member of a size and shape to rest upon the front of the shoulders of a horse in the position normally occupied by a collar. Extending therefrom lengthwise of the horse's neck are two side members 11 and a bottom member 12 which are secured to a second U-shaped member 13. The lower member 12 is bent in the manner shown, so that a portion extends upwardly adjacent the horse's neck and another portion extends beneath the animal's jaw. The member 12 is sufficiently rigid to resist bending by the horse as it moves its head and neck, but is capable of being bent by the person applying it before placement on the horse, so as to accommodate it properly to the neck and head of the animal to which it is applied. The U-shaped member 13 is shaped to pass partially around the horse's head, and is spaced therefrom sufficiently to prevent the animal from injuring his head on it.

The entire device is supported on the horse's neck by means of two straps 14 and 15, one of which is secured to loops 16 at the ends of the U-shaped collar 10 and forms with it a complete collar which fits against the horse's shoulders as in the case of an ordinary collar. The strap 15 is secured to the members 11 intermediate their length and thus passes over the horse's neck between his head and shoulders.

In order to secure the horse's head within the device and also to provide some degree of support for the forward end of the cradle, a pair of snap hooks 18 are secured to eyes at the upper ends of the U-shaped member 13, and it will be noted from Figure 1 that the U-shaped member and the snap hooks are so arranged that the snap hooks can be secured to the upper halter rings 19. A strap 20 is secured to the member 12 adjacent the U-shaped member 13, and is adapted to be passed through the lower halter ring 21 to further aid in supporting the cradle in proper position on the animal. This strap 20 prevents the device from turning on the neck as the horse rolls. In order to strengthen the joint between the members 12 and 13, a U-shaped brace 22 may be welded to these members as clearly shown in Figure 2. A similar brace 23 may be welded to the other end of the member 12 and to the member 10 for similar strengthening purposes.

With the cradle in place on the horse, it can be seen that the horse is not restricted so far as lowering his head and neck is concerned so he can reach the ground if he so desires. At the same time, however, the cradle prevents him from bending his neck sideways in order to reach his legs. The horse is not unduly limited in moving his head sideways as the device is light and can be moved as a whole; however, he cannot bend his neck sideways to any great extent. Most important, however, is the fact that the horse can lower his head to reach the ground in front of him, but once his head and neck are in this position he cannot reach back to his legs. If he attempts to do so the U-shaped member 13 and the snap hooks cooperate to prevent such movement. Thus the horse is not prevented from making any movement except one which would permit him to reach his legs. It will be noted that the collar 10 rests upon the horse in the position usually occupied by a collar. The horse cannot therefore catch the member 10 on the lower stable door or the webbing fence stretched across the lower part of his stall. Even if he should catch this portion of the device on some solid object and pull rearwardly, the device would not injure him because the U-shaped member 13 would merely cause him to lift his head. In addition to this, it will be noted that the member 12 permits the horse to put his head out of the stable door, and if he lowers his head in this position he will not bend the device out of shape. It will be noted that the hooks 18 and the strap 20 secure the device to the horse's head, cooperating to prevent the horse from moving his head or his neck in a downward direction by virtue of their engagement with the halter. The device does not depend upon something engaging the lower part of the horse's body to keep him from so moving his head. Horses are accustomed to being tied and otherwise restrained by the halter, and thus the device introduces no unusual sensations which might frighten the horse.

The present device can be left on the horse even when the horse lies down or rolls on the ground. Sufficient sideways movement of the neck and head is permitted so that the horse can rise from a lying position and the device will not slip around the horse's neck when he rolls over from one side to another on his back, because it is kept centered by the strap 20 and hooks 18.

Thus it is seen that there has been provided a device which limits the freedom of movement of a horse very slightly, but positively prevents him from doing himself an injury while his legs are being given any of the various treatments necessary for his welfare.

I claim:

1. A device for preventing a horse from reaching its legs comprising, a U-shaped member engageable with the front of the shoulders and breast of the horse, a second U-shaped member having portions engageable with the sides of the animal's head forward of its throat and a portion engageable under the jaw of the horse forwardly of its throat, whereby to limit the ability of the horse to move its head both in a turning and nodding direction with respect to its neck, and means connecting said U-shaped members.

2. A device for preventing a horse from reaching its legs comprising, a U-shaped frame member adapted to engage the breast and shoulders of the horse, a second U-shaped member having portions engageable with the sides of the horse's head forward of its throat and a portion engageable under its jaw forward of its throat, and means connecting said U-shaped members and preventing relative movement therebetween upon movement of the horse.

3. A device for preventing a horse from reaching its legs comprising, a U-shaped member and a strap member engageable with the horse's body in the position of a collar, a U-shaped member adapted to extend on each side of the horse's head and under its jaw in front of its throat, means adapted to connect the latter U-shaped member to a halter, and a member connecting the lower portions of said U-shaped members, said connecting member being curved to conform with the neck and jaw line of the horse.

4. A device for preventing a horse from reaching its legs comprising, a U-shaped member and a strap member engageable with the horse's body in the position of a collar, a U-shaped member adapted to extend on each side of the horse's head and under its jaw in front of its throat, means adapted to connect the latter U-shaped member to upper and lower halter rings, a connecting member extending between the bottoms of the U-shaped members, said member being curved to conform with the neck and jaw line of the horse, and a pair of connecting members connecting the ends of the U-shaped members to each other, said members adapted to extend along the neck of the horse.

5. A device for preventing a horse from reaching its legs comprising, a U-shaped member and a strap member engageable with the horse's body in the position of a collar, a U-shaped member adapted to extend on each side of the horse's head and under its jaw in front of its throat, and a connecting member extending between the bottoms of the U-shaped members, said connecting member being of bendable material but of sufficient rigidity to resist bending by the horse, whereby the horse is prevented from bending its head sufficiently to reach its legs.

FRED C. MARMET.